US010276849B2

(12) United States Patent
Uchida et al.

(10) Patent No.: US 10,276,849 B2
(45) Date of Patent: Apr. 30, 2019

(54) SEPARATOR INCLUDING POLYOLEFIN MICROPOROUS MEMBRANE AND INORGANIC POROUS LAYER, AND NONAQUEOUS ELECTROLYTE BATTERY USING THE SAME

(71) Applicant: Asahi Kasei E-materials Corporation, Tokyo (JP)

(72) Inventors: Yuki Uchida, Tokyo (JP); Hiroshi Murata, Tokyo (JP); Hiroshi Hatayama, Tokyo (JP); Masaki Ishikawa, Tokyo (JP)

(73) Assignee: Asahi Kasei E-materials Corporation, Tokyo (JP)

( * ) Notice: Subject to any disclaimer, the term of this patent is extended or adjusted under 35 U.S.C. 154(b) by 122 days.

(21) Appl. No.: 14/901,241

(22) PCT Filed: Jun. 19, 2014

(86) PCT No.: PCT/JP2014/066335
§ 371 (c)(1),
(2) Date: Dec. 28, 2015

(87) PCT Pub. No.: WO2014/208454
PCT Pub. Date: Dec. 31, 2014

(65) Prior Publication Data
US 2016/0372730 A1   Dec. 22, 2016

(30) Foreign Application Priority Data

Jun. 27, 2013 (JP) ................. 2013-134439

(51) Int. Cl.
*H01M 2/16* (2006.01)
*H01G 11/52* (2013.01)
*H01M 10/0525* (2010.01)

(52) U.S. Cl.
CPC .......... *H01M 2/1686* (2013.01); *H01G 11/52* (2013.01); *H01M 2/162* (2013.01);
(Continued)

(58) Field of Classification Search
CPC .. H01M 2/1686; H01M 2/1613; H01M 2/162; H01M 2/1653; H01M 2/1646; H01G 11/52
(Continued)

(56) References Cited

U.S. PATENT DOCUMENTS

2005/0058823 A1   3/2005   Funaoka et al.
2009/0291355 A1   11/2009   Baba et al.
(Continued)

FOREIGN PATENT DOCUMENTS

CN   104205419 A   12/2014
EP   2116372 A1   11/2009
(Continued)

OTHER PUBLICATIONS

Supplemental European Search Report issued in corresponding European Patent Application No. 14818389.0 dated Jul. 15, 2016.
(Continued)

*Primary Examiner* — Sean P Cullen
(74) *Attorney, Agent, or Firm* — Morgan, Lewis & Bockius LLP

(57) ABSTRACT

A separator for nonaqueous electrolyte batteries having multilayer porous membrane, having a polyolefin microporous membrane and a porous layer having an inorganic filler, disposed on at least one side of the polyolefin microporous membrane, wherein, in pores with an area of 0.01 µm² or more in a cross section of the porous layer, the pores having an angle θ formed between a major axis of each pore and an axis in parallel with an interface between the microporous
(Continued)

membrane and the porous layer in a range of 60°≤θ≤120° occupying a proportion of 30% or more therein.

16 Claims, 3 Drawing Sheets

(52) U.S. Cl.
CPC ....... *H01M 2/1613* (2013.01); *H01M 2/1646* (2013.01); *H01M 2/1653* (2013.01); *H01M 10/0525* (2013.01); *H01M 2220/20* (2013.01); *Y02E 60/122* (2013.01); *Y02E 60/13* (2013.01); *Y02T 10/7011* (2013.01); *Y02T 10/7022* (2013.01)

(58) Field of Classification Search
USPC ........................................ 429/144, 145, 251
See application file for complete search history.

(56) References Cited

U.S. PATENT DOCUMENTS

| | | |
|---|---|---|
| 2010/0112432 A1 | 5/2010 | Nishida et al. |
| 2010/0203396 A1 | 8/2010 | Murata |
| 2011/0269010 A1 | 11/2011 | Sawaguchi et al. |
| 2013/0302661 A1* | 11/2013 | Kim ...................... H01M 2/145 429/144 |
| 2014/0295170 A1 | 10/2014 | Kim et al. |
| 2015/0050545 A1 | 2/2015 | Murata et al. |

FOREIGN PATENT DOCUMENTS

| | | |
|---|---|---|
| EP | 2153990 A1 | 2/2010 |
| EP | 2433795 A1 | 3/2012 |
| EP | 2528142 A2 | 11/2012 |
| JP | 2007-083549 A | 4/2007 |
| JP | 2007-123237 A | 5/2007 |
| JP | 2008-524824 A | 7/2008 |
| JP | 2008-270178 A | 11/2008 |
| JP | 2011-113915 A | 6/2011 |
| JP | 4789274 B2 | 10/2011 |
| KR | 20130048843 A | 5/2013 |
| WO | 2000/020492 A1 | 4/2000 |
| WO | 2006/068428 A1 | 6/2006 |
| WO | 2012/023197 A1 | 2/2012 |
| WO | WO-2013066012 A1 * | 5/2013 ............ H01M 2/145 |

OTHER PUBLICATIONS

International Search Report issued in corresponding International Patent Application No. PCT/JP2014/066335 dated Sep. 22, 2014.

* cited by examiner

SEPARATOR INCLUDING POLYOLEFIN MICROPOROUS MEMBRANE AND INORGANIC POROUS LAYER, AND NONAQUEOUS ELECTROLYTE BATTERY USING THE SAME

TECHNICAL FIELD

The present invention relates to a separator for nonaqueous electrolyte batteries, and a nonaqueous electrolyte battery.

BACKGROUND ART

Although a lithium ion secondary battery has a high output density and capacity density, electrolyte may be decomposed by the heat generated in an abnormal situation such as short circuiting and overcharging in some cases because of the use of an organic solvent therein and fire may occur in the worst case. In order to prevent such a case, several safety functions are incorporated in a lithium ion secondary battery, including the shutdown function of a separator. The shutdown function is a function of blocking micro pores of a separator due to thermal fusion or the like in an abnormal heat generation in a battery so as to stop the electrochemical reaction from proceeding through inhibition of ionic conduction in the electrolyte. In general, it is believed that higher safety is obtained as the shutdown temperature decreases. Examples of the reasons for using polyethylene as the component of a separator include having a proper shutdown temperature. In the case of a battery having high energy, however, the temperature in the battery continues to rise even after the electrochemical reaction is stopped from proceeding by shutdown, so that a problem of short-circuiting both ends occurs due to rapture of the membrane of a separator, or the like.

On the other hand, applications of nonaqueous electrolyte batteries such as a lithium ion secondary battery to the usage in need of charging/discharging a large current in a short time, for example, the usage in electric vehicles and hybrid electric vehicles, are rapidly expanding. Accordingly, the safety characteristics are required to be improved without sacrificing output characteristics severely required for the usage.

In Patent Literature 1, a multilayer porous membrane including a porous membrane including a polyolefin resin as a main component, and a porous layer having a mass fraction of inorganic filler of 50% or more and less than 100% laminated on at least one side of the porous membrane is disclosed. In the literature, a technique for achieving both of an excellent heat resistance for preventing both ends from being short-circuited and an excellent shutdown function, even in the case of having a large amount of heat generated in an abnormal heat generation.

CITATION LIST

Patent Literature

Patent Literature 1: Japanese Patent No. 4789274

SUMMARY OF INVENTION

Technical Problem

The technique described in Patent Literature 1, however, requires improvement in terms of ionic conductivity for the requirement for high output characteristics for in-vehicle usage or the like.

In view of these circumferences, it is an object of the present invention to provide a separator for nonaqueous electrolyte batteries having excellent ionic conductivity with a low membrane resistance, and a nonaqueous electrolyte battery having high output characteristics.

Solution to Problem

Through intensive study for achieving the object, the present inventors found that the problem can be solved by specifying the pore structure in a porous layer which contains an inorganic filler, so that the present invention has been accomplished.

Namely, the present invention is as follows.

[1]

A separator for nonaqueous electrolyte batteries comprising a multilayer porous membrane, comprising:

a polyolefin microporous membrane; and a porous layer comprising an inorganic filler, disposed on at least one side of the polyolefin microporous membrane;

wherein, in pores with an area of 0.01 $\mu m^2$ or more in a cross section of the porous layer, the pores having an angle θ formed between a major axis of each pore and an axis in parallel with an interface between the microporous membrane and the porous layer in a range of 60°≤θ≤120° occupying a proportion of 30% or more therein.

[2]

The separator for the nonaqueous electrolyte batteries according to [1], wherein, in the pores with an area of 0.01 $\mu m^2$ or more in the cross section of the porous layer, the pores having an angle θ formed between the major axis of each pore and the axis in parallel with the interface between the microporous membrane and the porous layer in the range of 60°≤θ≤120° occupying a proportion of 40% or more therein.

[3]

The separator for the nonaqueous electrolyte batteries according to [1] or [2], wherein the porous layer has a thickness of 2 μm or more and 10 μm or less.

[4]

The separator for the nonaqueous electrolyte batteries according to any one of [1] to [3], wherein the inorganic filler has an aspect ratio of 1 or more and 3 or less.

[5]

A nonaqueous electrolyte battery comprising:

a separator comprising a polyolefin microporous membrane;

a positive electrode;

a negative electrode; and an electrolyte; and an porous layer comprising an inorganic filler, disposed on at least one side of the polyolefin microporous membrane, or a surface of the positive electrode or the negative electrode;

wherein, in pores with an area of 0.01 $\mu m^2$ or more in a cross section of the porous layer, the pores having an angle θ formed between a major axis of each pore and an axis in parallel with an interface between the polyolefin microporous membrane, the positive electrode, or the negative electrode and the porous layer in a range of 60°≤θ≤120° occupying a proportion of 30% or more therein.

Advantageous Effect of Invention

The present invention can provide a separator for nonaqueous electrolyte batteries having excellent ionic conductivity with a low membrane resistance, and a nonaqueous electrolyte battery having high output characteristics.

DESCRIPTION OF EMBODIMENT

Figure 1:
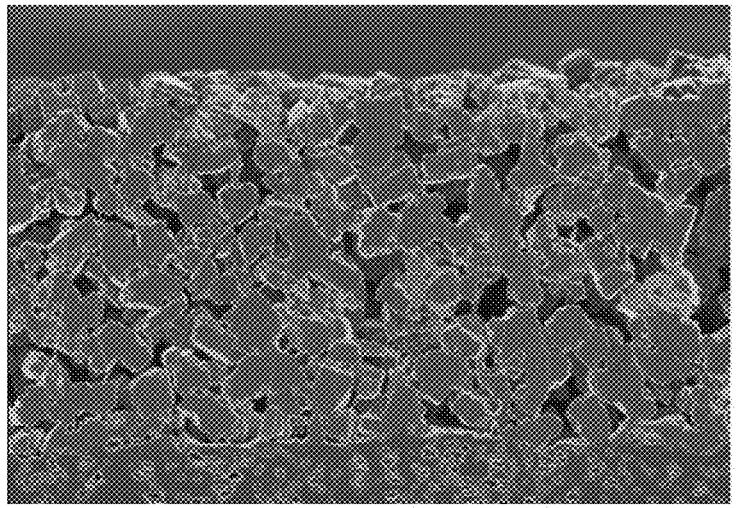
FIG. 1 shows a cross-sectional SEM image of the porous layer of the multilayer porous membrane in Example 1.

The embodiment of the present invention (hereinafter abbreviated as "present embodiment") is described in detail as follows. The present invention, however, is not limited to the following embodiments, and various modifications may be made without departing from the spirit of the present invention to perform the present invention.

[Separator for Nonaqueous Electrolyte Batteries]

The separator in the present embodiment comprising a multilayer porous membrane comprising a polyolefin microporous membrane (layer A) and a porous layer (layer B) disposed on at least one side of the layer A. A conventional problem is that a further higher porosity for seeking high output characteristics and improving the ionic conductivity of a separator causes unavoidable reduction in voltage endurance and membrane strength, with reduction in heat resistance. In contrast, the separator for nonaqueous electrolyte batteries in the present embodiment has an excellent ionic conductivity and a low membrane resistance, with the voltage endurance and the membrane strength being maintained, due to having a porous layer (layer B) with the below-mentioned pores.

[Porous Layer (Layer B)]

In the present embodiment, the layer B is porous.

The separator in the present embodiment has pores with an area of 0.01 µm² or more in the cross section of the layer B. When each of the pores with an area of 0.01 µm² or more is transformed into an ellipse, an angle θ is formed between the major axis of the pore and the axis in parallel with the interface between the layer A and the layer B. The proportion of the pores in the range of 60° 120° is 30% or more. Consequently the separator of the present embodiment is excellent in heat resistance and output characteristics.

The area of a pore can be calculated from binarization of the cross-sectional SEM image obtained by observing the cross section of the layer B with a scanning electron microscope (SEM) at a photographing magnification of 10,000.

More particularly, the area of a pore and the angle θ can be measured by the following method.

First, a separator is subjected to broad ion beam (BIB) cross sectioning. In the processing, the separator is cooled until immediately before processing for preventing thermal damage in an as needed basis. More particularly, the separator is left standing in a cooling device at −40° C. for 1 day. A smooth cross section of the separator can be thus obtained.

The cross section of the separator thus obtained is subjected to a conductive treatment with a paste of C and a coating of Os, so as to be photographed by "HITACHI S-4700" (manufactured by Hitachi High-Tech Fielding Corporation) at a photographing magnification of 10,000 and an accelerating voltage of 1.0 kV, with a detector of secondary electrons (upper). From the electronic image of the cross-sectional SEM image thus obtained, the angle θ of a pore is calculated.

The angle θ is calculated by the following method using an image processing software "Image J" (version 1.46). The electronic image of a desired cross-sectional SEM view is displayed and a known distance in the image is measured by a line selection tool "Straight." "Analyze" to "SET SCALE" is opened. Then, a measurement unit and the known distance are inputted for setting a scale. Subsequently, a pretreatment for binarization is performed by painting the pores in the layer B in a black color as voids, using "Paintbrush Tool."

Figure 5:
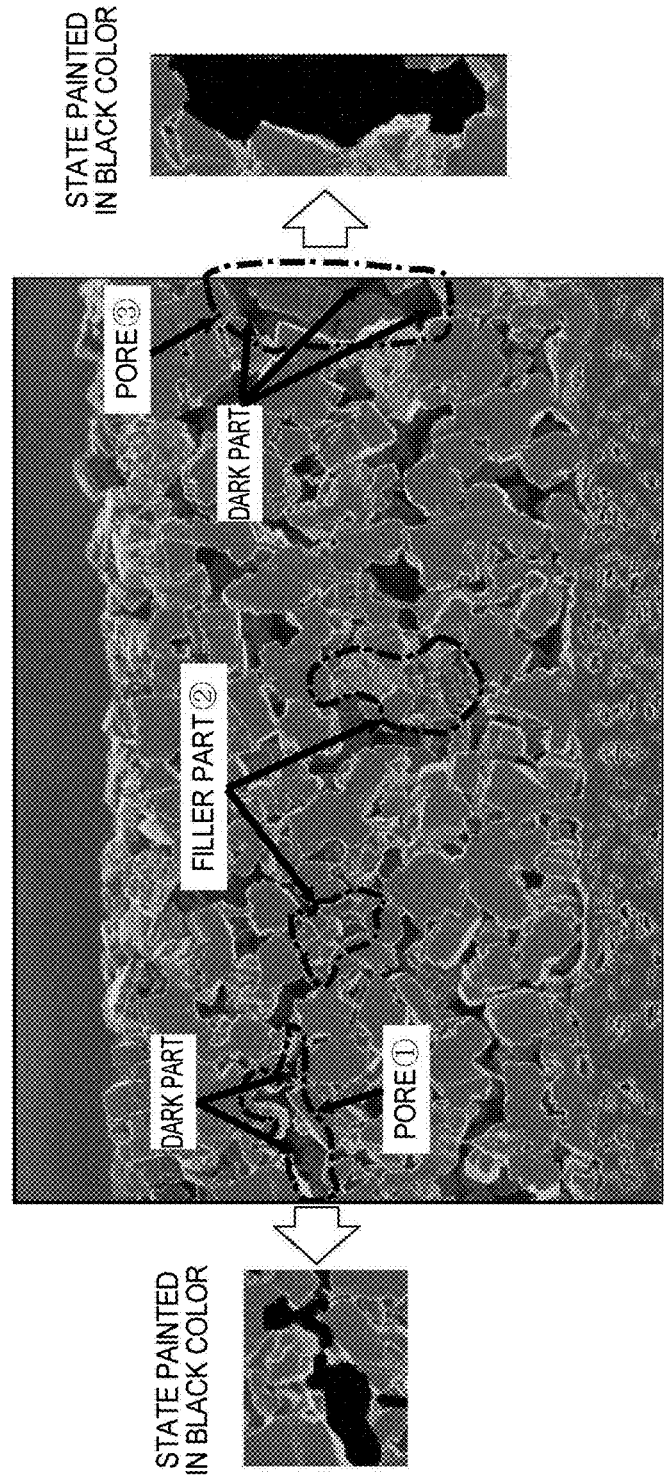
FIG. 5 shows an illustration showing the method for identifying pores, using the SEM image in FIG. 1 as an example.

Since the pores are not necessarily clearly identified depending on the measurement object in some cases, the identification method is described with reference to FIG. 5 as an example. FIG. 5 is the cross-sectional SEM image of a porous layer of the multilayer porous membrane in FIG. 1. For example, when attention is paid to a pore 1 at the left end in FIG. 5, a dark part is present with no filler located in the rear. Such a region with a closed contour around the dark part is identified as a pore (void). In this case, although a filler is also observed inside the identified pore, it can be evaluated that the portion composes part of the void and contributes to the ionic conductivity. Consequently, the portion is identified as a pore without problems. On the other hand, it cannot be evaluated that a filler part 2 positioned slightly backward of the BIB-processed cross section contributes to the ionic conductivity. Consequently, the filler part 2 is not identified as a pore. The pores are thus identified around the dark parts in an image photographed under the conditions for SEM imaging, so that pores in accordance with the technical meaning of the present embodiment can be identified for various measurement objects.

The contour identified around the dark part is cut off at the end of an SEM image in some cases (e.g. a pore 3). In such an image end, it is clear that the portion having an identified contour around the dark part ending off halfway composes a pore and contributes to the ionic conductivity. Consequently, the portion is identified as a pore.

As described above, after the pores (voids) are painted, a binarization is performed. More particularly, using "Rectangular selections" for selecting an evaluation area, a desired region (layer B) is selected. In the selection, the surface layer part of the layer B is excluded. Subsequently, in order to make the selected area in a separate file, a new electronic image including the layer B alone is made, using "Image" to "Duplicate." Subsequently, the electronic image thus obtained is subjected to a treatment for identifying pores. More particularly, "Image" to "Adjust" to "Threshold" is selected and the regions having a gradation of "0 to 100" in 256 gradations are painted in a single color.

Subsequently, the pores painted in a single color in the binarization are transformed into ellipses. More particularly, "Analyze particles" is selected, and "0.01 µm² or more" is inputted into an item "Size." Further, "Ellipse" is selected in an item Show, so that an image including each of the pores of 0.01 µm² or more transformed into an ellipse is obtained.

Lastly, an angle θ formed between the major axis of the pore and the axis in parallel with the interface between the microporous membrane and the porous layer is calculated for each pore transformed into an ellipse. A histogram of the angles θ thus obtained is made, so that the proportion of the pores in the range of 60°≤θ≤120° in the total of the pores is calculated.

The separator of the present embodiment has a high ionic conductivity and a low membrane resistance, due to having the pore structure. Consequently, a nonaqueous electrolyte secondary battery having high output characteristics can be obtained. Although the reasons are not clear, it is conceivable that the layer B having the pore structure allows the diffusive transfer of lithium ions to be accelerated and a low membrane resistance to be maintained, so that high output characteristics can be achieved.

The proportion of the pores having an angle θ in the range of 60°≤θ≤120° is preferably 30% or more and 70% or less, more preferably 35% or more and 70% or less, still more preferably 35% or more and 50% or less, particularly preferably 40% or more and 50% or less. With a proportion of the angles in the range of 60°≤θ≤120° of 30% or more, the diffusion rate of a lithium ion in the electrolyte is fast, which tends to be more advantageous in achieving high output characteristics of a battery. A proportion of 70% or less is preferable from the viewpoint of reducing the thermal shrinkage of a separator at high temperature.

The pore structure may be controlled by, for example, the setting temperature of drying an liquid comprising the inorganic filler after application to the layer A, the shape of inorganic filler for use, the average particle size of inorganic filler, and the layer density of the layer B, though not particularly limited. For example, a method for gradually raising the drying temperature tends to increase the proportion of the pores having an angle θ in the range of 60°≤θ≤120° in comparison with a method for rapidly raising the temperature. Also, a method using an inorganic filler in a block shape tends to increase the proportion of the pores having an angle θ in the range of 60°≤θ≤120° in comparison with a method using an inorganic filler in a plate shape. Also, with a larger particle size of inorganic filler, the layer density in the layer B tends to decrease, and the proportion of the pores having an angle θ in the range of 60°≤θ≤120° tends to increase.

In the present embodiment, the layer B comprises an inorganic filler. Since the layer B comprises an inorganic filler, the separator of the present embodiment has heat resistance. Consequently, a lithium ion secondary battery having high safety can be obtained.

The proportion of inorganic filler in the layer B is preferably 75 to 98 mass %, more preferably 85 mass % or more, still more preferably 95 mass % or more, in terms of ionic conductivity, the membrane strength, and the high heat resistance for use as a separator of batteries.

The inorganic filler for use in the layer B of the present embodiment preferably has a melting point of 200° C. or higher, high insulating characteristics, and electrochemical stability in the range of use for lithium ion secondary batteries, though not particularly limited.

Examples of the inorganic filler include: oxide ceramics such as alumina, silica, titania, zirconia, magnesia, ceria, yttria, zinc oxide, and iron oxide; nitride ceramics such as silicon nitride, titanium nitride, and boron nitride; ceramics such as silicon carbide, calcium carbonate, magnesium sulfate, aluminum sulfate, aluminum hydroxide, aluminum hydroxide oxide, potassium titanate, talc, kaolinite, dickite, nacrite, halloysite, pyrophyllite, montmorillonite, sericite, mica, zeolite, calcium silicate, and silica sand; and glass fiber; which may be used singly or may be used in combination thereof, though not particularly limited.

Among them, aluminum oxide compounds such as alumina and aluminum hydroxide oxide, or aluminum silicate compounds such as kaolinite, dickite, and nacrite, which have no ion exchange capability, are preferred, from the viewpoints of the electrochemical stability and the heat resistance characteristics of a separator.

Particularly preferred examples of the aluminum oxide compounds include boehmite, though not particularly limited. More preferred examples of the aluminum silicate compounds having no ion exchange capability include kaolin mainly composed of kaolin minerals due to easy availability at low cost, though not particularly limited. Among two types of kaolin, i.e. wet kaolin and calcined kaolin made by calcining the wet kaolin, calcined kaolin is preferred in terms of electrochemical stability, because a calcination treatment allows water of crystallization to be emitted and impurities to be removed in parallel.

The inorganic filler has an average particle size of, for example, preferably 0.1 µm or more and 4.0 µm or less, more preferably more than 0.4 µm and 3.0 µm or less, though not particularly limited. The average particle size in the range is preferred, because thermal shrinkage can be reduced at high temperature even with a thin thickness of a porous material (e.g. 7 µm or less).

In the inorganic filler, the proportion of particles having a particle size of more than 0.5 µm and 2.0 µm or less in the total of inorganic filler is preferably 8 vol. % or more, more preferably 10 vol. % or more, though not particularly limited, with an upper limit of, preferably 60 vol. % or less, more preferably 50 vol. % or less, though not particularly limited.

The particle size distribution of inorganic filler controlled in the range is preferred because thermal shrinkage can be reduced at high temperature even with a thin thickness of a porous layer (e.g. 7 µm or less). Examples of the method for controlling the proportion of the particle size include pulverizing the inorganic filler into particles with a smaller diameter using a ball mill, a bead mill, or a jet mill, though not particularly limited.

Examples of the shape of inorganic filler include a plate shape, a flaky shape, a needle shape, a columnar shape, a spherical shape, a block shape, a polyhedron shape, and an aggregate shape, though not particularly limited. A plurality of inorganic fillers having any of the shapes may be used in combination. From the viewpoint of improving permeability, a block shape, a polyhedron shape, and a columnar shape are preferred, having a plurality of planes.

The inorganic filler has an aspect ratio of, for example, preferably 1 or more and 3 or less, though not particularly limited. With an aspect ratio of 3 or less, the pores having an angle θ formed between the major axis of each pore in the layer B and an axis in parallel with the interface between the layer A and the layer B in the range of 60°≤θ≤120° occupy a proportion of 30% or more, which is preferred because good permeability tends to be obtained. The aspect ratio is measured by the below-mentioned method.

The layer thickness of the layer B is, for example, preferably 2 to 10 µm, more preferably 3 to 8 µm, though not particularly limited. With a thickness of the porous layer of 2 µm or more, a better thermal shrinkage ratio at high temperature tends to be obtained, and a thickness of 10 µm or less is preferred from the viewpoint of the increase in capacity and the permeability of a battery.

The layer density of the layer B is, for example, preferably 0.5 to 1.6 g/cm$^3$, more preferably 0.7 to 1.4 cm$^3$, though not particularly limited. With a layer density of the porous layer of 0.5 g/cm$^3$ or more, a better thermal shrinkage ratio at high temperature tends to be obtained, and with a layer density of the porous layer of 1.6 g/cm$^3$ or more, the air permeability tends to decrease.

In the present embodiment, the layer B preferably comprises, for example, a resin binder in addition to the inorganic filler, though not particularly limited. The inclusion of a resin binder is preferred, because the binding characteristics between inorganic fillers and binding characteristics between the inorganic filler and a polyolefin membrane can be improved.

In the case of using the separator of the present embodiment as a separator for a lithium ion secondary battery, the resin binder is preferably insoluble in the electrolyte of the lithium ion secondary battery and electrochemically stable in the range of use of the lithium ion secondary battery, though the kind of the resin binder is not particularly limited.

Specific examples of the resin binder include: a polyolefin such as polyethylene and polypropylene; a fluorine-containing resin such as vinylidene fluoride and polytetrafluoroethylene; a fluorine-containing rubber such as a vinylidene fluoride-hexafluoropropylene-tetrafluoroethylene copolymer and an ethylene-tetrafluoroethylene copolymer; rubbers such as a styrene-butadiene copolymer and a hydride thereof, an acrylonitrile-butadiene copolymer and a hydride thereof, an acrylonitrile-butadiene-styrene copolymer and a hydride thereof, a methacrylate-acrylate copolymer, a styrene-acrylate copolymer, an acrylonitrile-acrylate copolymer, an ethylene-propylene rubber, polyvinyl alcohol, and polyvinyl acetate; a cellulose derivative such as ethyl cellulose, methyl cellulose, hydroxyethyl cellulose, and carboxymethyl cellulose; and a resin having a melting point and/or a glass transition temperature of 180° C. or higher such as polyphenylene ether, polysulfone, polyether sulfone, polyphenyl sulfone, polyphenylene sulfide, polyetherimide, polyamide imide, and polyester, though not particularly limited.

In the case of using polyvinyl alcohol as the resin binder, the degree of saponification thereof is preferably 85% or more and 100% or less, though not particularly limited. With a degree of saponification of 85% or more, the temperature at which a battery is short-circuited (short circuit temperature) is improved, so that good safety performance tends to be obtained, which is preferred. The degree of saponification is more preferably 90% or more and 100% or less, still more preferably 95% or more and 100% or less, particularly preferably 99% or more and 100% or less. The degree of polymerization of polyvinyl alcohol is preferably 200 or more and 5,000 or less, more preferably 300 or more and 4,000 or less, still more preferably 500 or more and 3,500 or less, though not particularly limited. With a degree of polymerization of 200 or more, an inorganic filler such as calcined kaolin can be firmly bound by using a small amount of polyvinyl alcohol, so that the increase of air permeability of a multilayer porous membrane due to formation of a porous layer tends to be suppressed, with the mechanical strength of a porous material being maintained, which is preferred. With a degree of polymerization of 5,000 or less, gelatinization or the like during preparation of a coating liquid tends to be prevented, which is preferred.

A resin latex binder is preferred as the resin binder. In the case of using a resin latex binder, due to the layer B comprising the inorganic filler and the binder laminated on at least one side of a polyolefin porous membrane (layer A), the ion permeability hardly decreases, so that high output characteristics can be easily obtained. In addition, when the temperature increases rapidly during abnormal heat generation, safety can be easily obtained with smooth shutdown.

A product obtained by emulsion polymerization of an aliphatic conjugated diene monomer, an unsaturated carboxylic acid monomer, or another monomer copolymerizable with the above-described monomers is preferred as the latex binder from the viewpoints of electrochemical stability and binding characteristics, though not particularly limited.

A conventional method can be used in the emulsion polymerization, without particular limitations. As the method for adding the monomers and other components, any one of a batch addition method, a split addition method, and a continuous addition method may be employed without particular limitations. Any one of a one-step polymerization, two-step polymerization, a multistep polymerization, and the like may be employed.

Examples of the aliphatic conjugated diene monomer include 1,3-butadiene, 2-methyl-1,3-butadiene, 2,3-dimethyl-1,3-butadiene, 2-chloro-1,3-butadiene, substituted straight chain conjugated pentadienes, and substituted and side-chain conjugated hexadienes, though not particularly limited. These may be used singly or in combinations of two or more. In particular, 1,3-butadiene is preferred among them.

Examples of the unsaturated carboxylic acid monomer include a monomer of acrylic acid, methacrylic acid, crotonic acid, maleic acid, fumaric acid, and itaconic acid, or carboxylic acid (anhydride), though not particularly limited. These may be used singly or in combinations of two or more. In particular, acrylic acid and methacrylic acid are preferred among them.

Examples of the another monomer copolymerizable with the above-described monomers include an aromatic vinyl monomer, a vinyl cyanide monomer, an unsaturated carboxylic acid alkyl ester monomer, a hydroxyalkyl group-containing unsaturated monomer, and an unsaturated carboxylic acid amide monomer, though not particularly limited. These may be used singly or in combinations of two or more. In particular, an unsaturated carboxylic acid alkyl ester monomer is preferred among them. Examples of the unsaturated carboxylic acid alkyl ester monomer include methyl acrylate, methyl methacrylate, ethyl acrylate, ethyl methacrylate, butyl acrylate, glycidyl methacrylate, dimethyl fumarate, diethyl fumarate, dimethyl maleate, diethyl maleate, dimethyl itaconate, monomethyl fumarate, monoethyl fumarate, and 2-ethylhexyl acrylate. These may be used singly or in combinations of two or more. In particular, methyl acrylate is preferred among them.

In the emulsion polymerization, a monomer component other than the above may be used in addition to the monomers, for example, in order to improve various qualities and physical properties, though not particularly limited.

The resin binder has an average particle size of, preferably 50 to 500 nm, more preferably 60 to 460 nm, still more preferably 80 to 250 nm, though not particularly limited. With an average particle size of the resin binder of 50 nm or more, the ion permeability hardly decreases, so that high output characteristics can be easily obtained, when of a porous layer (layer B) comprising the inorganic filler and the binder is laminated on at least one side of a polyolefin porous membrane (layer A). In addition, when the temperature increases rapidly during abnormal heat generation, high safety can be easily obtained with smooth shutdown. With an average particle size of the resin binder of 500 nm or less, good binding characteristics is obtained and the thermal shrinkage ratio tends to decrease when used for a multilayer membrane, which is preferred.

The average particle size of a resin binder can be controlled through adjustment of the polymerization time, the polymerization temperature, the raw material composition ratio, the feeding sequence of raw materials, the pH, and the like.

Examples of the method for forming the layer B include a method of applying a coating liquid including an inorganic filler and a resin binder to at least one side of the layer A comprising a polyolefin resin as a main component so as to form a porous layer, though not particularly limited.

The preferred solvent of the coating liquid is, for example, a solvent which can uniformly dissolve or disperse the inorganic filler and the resin binder in a stable state, though not particularly limited. Examples thereof include N-methylpyrrolidone, N,N-dimethylformamide, N,N-dimethylacetamide, water, ethanol, toluene, hot xylene, methylene chloride, and hexane.

To the coating liquid, various additives including a dispersant such as a surfactant; a thickener; a wetting agent; a defoamer; and a pH adjusting agent may be added without limitations, for example, in order to improve dispersion stability and coatability. Although the additives which can be removed together with the solvent is preferred, the additives may be left in the porous layer as long as being electrochemically stable in the range of use of a nonaqueous electrolyte battery without inhibition of the battery reaction, and as long as remaining stable up to about 200° C.

The method for dissolving or dispersing the inorganic filler and the resin binder in the solvent of a coating liquid is not particularly limited and a method which can obtain the dispersion characteristics of a coating liquid required for a coating process is preferred. Examples thereof include mechanical agitation by a ball mill, a bead mill, a planetary ball mill, a sand mill, a colloid mill, an attritor, a roll mill, a high speed impeller dispersion, a disperser, a homogenizer, a high speed impact mill, an ultrasonic dispersion, and an agitation blade.

The method for applying a coating liquid to the layer A may be determined depending on, for example, a layer thickness and an application area, without specific limitations. Examples thereof include a gravure coating method, a small diameter gravure coater method, a reverse roll coater method, a transfer roll coater method, a kiss coater method, a dip coater method, a knife coater method, an air doctor coater method, a blade coater method, a squeeze coater method, a cast coater method, a die coater method, a screen printing method, and spray coating method.

Preferably the porous membrane surface is subjected to a surface treatment prior to the application of the coating liquid, because the coating liquid is more easily applied and the adhesion between the porous layer comprising the inorganic filler and the porous membrane surface after application can be improved.

The surface treatment method is preferably a method which does not remarkably damage the porous structure of the layer, though not particularly limited. Examples of the method include a corona discharge treatment, a mechanical surface roughening method, a solvent treatment method, an acid treatment method, and an ultraviolet oxidation method.

Examples of the method for removing a solvent from a coating membrane after the application include a method of drying a fixed porous membrane at a temperature equal to or lower than the melting point thereof, and a method of vacuum drying at low temperature, though not particularly limited. From the viewpoint of controlling the shrinkage stress of the layer A and the multilayer membrane, preferably the drying temperature, the winding tension, and the like are appropriately adjusted. In order to arrange the direction of the pores in the longitudinal direction relative to the thickness direction of a membrane in the pore structure of the layer B, preferably the drying temperature is gradually raised.

[Polyolefin Microporous Membrane (Layer A)]

A polyolefin microporous membrane (layer A) is described as follows.

In the present embodiment, a microporous membrane means a porous membrane including a polyolefin resin as a main component. The "main component" means the component having the largest proportion of the mass among resin components to compose a microporous membrane.

From the viewpoints of the shutdown performance in a separator for a battery and the like, a porous membrane formed of a polyolefin resin composition comprising a polyolefin resin with a mass fraction of 50% or more and 100% or less in the resin components composing the layer A is preferred. The proportion of the polyolefin resin is more preferably 60% or more and 100% or less, particularly preferably 70% or more and 100%% or less.

The polyolefin resin means, for example, a polyolefin resin for conventional use in extruding, injection, inflation, and blow molding, without specific limitations. Examples of the polyolefin resin for use include a homopolymer, a copolymer, a multistep polymer of ethylene, propylene, 1-butene, 4-methyl-1-pentene, 1-hexene, and 1-octene. The polyolefins selected from the group consisting of the homopolymer, the copolymer, and the multistep polymer may be used singly or may be mixed for use. Typical examples of the polymer include low density polyethylene, linear low density polyethylene, medium density polyethylene, high density polyethylene, ultra high molecular weight polyethylene, isotactic polypropylene, atactic polypropylene, an ethylene-propylene random copolymer, polybutene, and an ethylene-propylene rubber.

In the case of using a multilayer porous membrane as a separator for batteries, use of a resin having the main component of high density polyethylene, in particular, is preferred because the resin has a low melting point and satisfies required performance of high strength.

From the viewpoint of improving the heat resistance of a porous membrane and the heat resistance of a multilayer porous membrane, use of a porous membrane of a resin composition which contains polypropylene and a polyolefin resin other than polypropylene is more preferred.

Herein, the conformational structure of polypropylene is not limited, so that any of isotactic polypropylene, syndiotactic polypropylene, and atactic polypropylene may be employed.

In the above-described case, the proportion of polypropylene based on the total polyolefin in a polyolefin resin composition is preferably 1 to 35 mass %, more preferably 3 to 20 mass %, still more preferably 4 to 10 mass %, from the viewpoint of achieving both of the heat resistance and the good shutdown function, though not particularly limited.

In that case, examples of the polyolefin resin other than polypropylene include a homopolymer or a copolymer of olefin hydrocarbon such as ethylene, 1-butene, 4-methyl-1-pentene, 1-hexene, and 1-octene, without limitations. More specific examples thereof include polyethylene, polybutene, and an ethylene-propylene random copolymer.

In the case of using as a separator for batteries or the like, pores are required to be closed by thermal fusion for shutdown. Preferred examples of the polyolefin resin other than polypropylene for use in that case include polyethylene such as low density polyethylene, linear low density polyethylene, medium density polyethylene, high density polyethylene, and ultra high molecular weight polyethylene. Among them, a polyethylene having a density measured in accordance with JIS K 7112 of 0.93 g/cm$^3$ or more is more preferably used from the viewpoint of strength.

The polyolefin resin has a viscosity average molecular weight of, for example, preferably 30,000 or more and 12,000,000 or less, more preferably 50,000 or more and less than 2,000,000, still more preferably 100,000 or more and less than 1,000,000, though not particularly limited. With a viscosity average molecular weight of 30,000 or more, the moldability is improved with an increased melt tension in melt molding and the high strength is obtained due to entanglement of polymers with each other, which is preferred. With a viscosity average molecular weight of 12,000,000 or less, uniform melt kneading is easily achieved, so that sheet formability, particularly excellent in thickness stability can be obtained, which is preferred.

In the case of using the multilayer porous membrane of the present embodiment as a separator for batteries, with a viscosity average molecular weight of less than 1,000,000, the pores are easily closed when temperature rises so as to achieve a good shutdown function, which is preferred. Alternatively, instead of using a polyolefin having a viscosity average molecular weight of less than 1,000,000 alone, a mixture of a polyolefin having a viscosity average molecular weight of 2,000,000 and a polyolefin having a viscosity average molecular weight of 270,000, which has a viscosity average molecular weight of less than 1,000,000, may be used.

The polyolefin resin composition to compose the layer A may contain optional additives. Examples of the additives include: a polymer other than polyolefin; an inorganic filler; a phenol-based, phosphorus-based, or sulfur-based antioxidant; metal soaps such as calcium stearate and zinc stearate; an ultraviolet absorber; a photostabilizer; an antistatic agent; an anticlouding agent; and a coloring pigment, though not particularly limited.

The total amount of the additives added is, for example, preferably 20 parts by mass or less, more preferably 10 parts by mass or less, still more preferably 5 parts by mass or less relative to 100 parts by mass of a polyolefin resin composition, though not particularly limited.

The average pore diameter of the layer A is not particularly limited, and may be appropriately determined depending on the usage. The pore diameter is preferably 0.001 to 10 µm, more preferably 0.01 to 1 µm, from the viewpoint of the characteristics as a separator for batteries.

A known manufacturing method may be employed as the method for manufacturing the porous membrane, without particular limitations. Examples of the method include: a porosifying method by forming the melt kneaded mixture of a polyolefin resin composition and a plasticizer into a sheet form, stretching the sheet in some cases, and then extracting the plasticizer; a porosifying method by extruding a melt kneaded polyolefin resin composition at a high draw ratio and then detaching the interface of polyolefin crystals through a heat treatment and stretching; a porosifying method by forming the melt kneaded mixture of a polyolefin resin composition and an inorganic filler into a sheet form, and then detaching the interface between the polyolefin and the inorganic filler by stretching; and a porosifying method by immersing a dissolved polyolefin resin composition in a poor solvent for the polyolefin, so that the polyolefin is solidified and the solvent is concurrently removed.

As an example of the method for manufacturing a porous membrane, a method of forming the melt kneaded mixture of a polyolefin resin composition and a plasticizer into a sheet form, and then extracting the plasticizer is described as follows.

First, a polyolefin resin composition and a plasticizer are melt kneaded. Examples of the melt kneading method include a method of: injecting a polyolefin resin composition which contains a polyolefin resin and other additives on an as needed basis into a resin kneading device such as an extruder, a kneader, a laboplastomill, kneading rolls, and a Banbury mixer; and introducing a plasticizer at any ratio therein so as to be kneaded, while the resin components are melted by heating. On this occasion, the polyolefin resin, the other additives, and the plasticizer are preferably pre-kneaded at a predetermined ratio prior to injection into a resin kneading device, using a Henschel mixer or the like, though not particularly limited. More preferably, part of the plasticizer only is injected in pre-kneading, and the remaining plasticizer is side-fed in a resin kneading device so as to be kneaded. The dispersibility of the plasticizer is thereby enhanced, so that the melt kneaded mixture of the resin composition and the plasticizer in a sheet form can be stretched at a high stretch ratio without rupture of the membrane in the subsequent process.

As the plasticizer, a non-volatile solvent which can form a uniform solution at the melting point of the polyolefin or higher can be used. Specific examples of the non-volatile solvent include hydrocarbons such as: a liquid paraffin and a paraffin wax; esters such as dioctyl phthalate and dibutyl phthalate; and higher alcohols such as oleyl alcohol and stearyl alcohol, though not particularly limited.

A liquid paraffin has high compatibility with polyethylene and polypropylene, so that detachment at the interface between the resin and the plasticizer hardly occurs when the melt kneaded product is stretched. In other words, a liquid paraffin is preferred among them, because uniform stretching can be easily performed.

The ratio between the polyolefin resin composition and the plasticizer is not particularly limited, and, for example, the range in which the uniformly melt kneaded mixture of the polyolefin resin composition and the plasticizer can be formed into a sheet form is preferred. The mass fraction of the plasticizer in a composition comprising the polyolefin resin composition and the plasticizer is, for example, preferably 30 to 80 mass %, more preferably 40 to 70 mass %. With a mass fraction of the plasticizer of 80 mass % or less, the melt tension is hardly insufficient during melt molding, so that the moldability tends to be improved. With a mass fraction of 30 mass % or more, no cut off of polyolefin chains occurs when the mixture of the polyolefin resin composition and the plasticizer is stretched at a high stretch ratio, so that the strength is easily increased due to formation of a uniform and microporous structure.

Subsequently, the melt kneaded product is formed into a sheet form. Examples of the method for manufacturing a sheet-like formed body include a method of extruding a melt kneaded product into a sheet form through a T-die, and contacting the extruded product with a thermal conductor so as to be cooled down to a temperature sufficiently lower than the crystallization temperature of the resin component for solidification. Examples of the thermal conductor for use in solidification by cooling include a metal, water, air, or a plasticizer itself, though not particularly limited. A metal roll is preferred, having a high thermal conductive efficiency. In the case of contacting with a metal roll, more preferably the sheet is held between rolls, so that the thermal conductive efficiency is further enhanced, and the sheet has increased membrane strength due to the orientation, with improved surface smoothness. The die lip gap for extruding a sheet from a T-die is preferably 400 μm or more and 3,000 μm or less, more preferably 500 μm or more and 2,500 μm or less, though not particularly limited. With a die lip gap of 400 μm or more, deposition of educt or the like is reduced and less impact such as streaks and defects are made on the quality of membrane, so that rupture of the membrane or the like can be prevented in the subsequent stretching process. With a die lip gap of 3,000 μm or less, the cooling rate is fast so that the variation in cooling can be prevented and the thickness stability of a sheet can be maintained.

Preferably a sheet-like formed body thus obtained is stretched. Although both of uniaxial stretching and biaxial stretching may be suitably employed in the stretching treatment, without particular limitations, biaxial stretching is preferred from the viewpoint of the strength of the porous membrane to be obtained and the like. A sheet-like formed body stretched in two axial directions at a high stretch ratio allows the molecules to be oriented in the plane direction, so that the porous membrane as a final product is hardly torn, having a high puncture strength. Examples of the stretching method include a simultaneous biaxial stretching process, a successive biaxial stretching process, a multistage stretching process, and a multi-time stretching process, without specific limitations. A simultaneous biaxial stretching process is preferred from the viewpoints of the improved puncture strength, the uniformity in stretching, and the shutdown characteristics.

Herein, the simultaneous biaxial stretching process means a stretching method of simultaneously performing stretching in MD direction (machine direction of a microporous membrane) and stretching in TD direction (transverse direction at an angle of 90° to the MD of a microporous membrane), which may have a different stretching ratio in each direction. The successive biaxial stretching process means a stretching method of independently performing stretching in MD direction or TD direction. In the method, when stretching is performed in MD direction or TD direction, the other direction is in an unbounded state, or in a state fixed at a constant length.

The stretching ratio is not particularly limited, and, for example, the plane ratio is preferably in the range of 20 or more and 100 or less, more preferably in the range of 25 or more and 50 or less. The stretching ratio in each axial direction is not particularly limited, preferably in the range of 4 or more and 10 or less in MD direction and in the range of 4 or more and 10 or less in TD direction, more preferably in the range of 5 or more and 8 or less in MD direction and in the range of 5 or more and 8 or less in TD direction. With a total area ratio of 20 or more, a porous membrane having sufficient strength can be obtained, and with a total area ratio of 100 or less, high productivity can be obtained with the rupture of membrane being prevented in the stretching process.

Alternatively, the sheet-like formed body may be rolled. The rolling method may be performed by, for example, pressing using a double belt pressing machine, though not particularly limited. Rolling allows the orientation to be enhanced particularly in the surface layer. The rolled surface ratio is not particularly limited, preferably more than 1 and 3 or less, more preferably more than 1 and 2 or less. With a rolling ratio of more than 1, the porous membrane as a final product has increased strength of membrane with increased planar orientation. On the other hand, with a rolling ratio of 3 or less, a porous structure can be formed uniformly in the thickness direction of a membrane, with a small difference in orientation between the surface layer and the internal central part, which is preferred.

Subsequently, the plasticizer is removed from the sheet-like formed body so as to make a porous membrane. Examples of the method for removing a plasticizer include a method of immersing a sheet-like formed body in an extractant for extracting the plasticizer and then drying the formed body thoroughly, though not particularly limited. The method for extracting a plasticizer may be any of a batch type and a continuous type. In order to suppress the shrinkage of the porous membrane, preferably the end of the sheet-like formed body is restrained in the consecutive processes of immersion and drying. The residual amount of the plasticizer in the porous membrane is not particularly limited, preferably less than 1 mass %.

The extractant is not particularly limited, and preferably, for example, an extractant which is a poor solvent for the polyolefin resin and a good solvent for the plasticizer, having a boiling point lower than the melting point of the polyolefin resin, is used. Examples of the extractant include: hydrocarbons such as n-hexane and cyclohexane; halogenated hydrocarbons such as methylene chloride and 1,1,1-trichloroethane; non-chlorine halogenated solvents such as hydrofluoro ether and hydrofluorocarbon; alcohols such as ethanol and isopropanol; ethers such as diethyl ether and tetrahydrofuran; and ketones such as acetone and methyl ethyl ketone, though not particularly limited. The extractants may be collected by operations such as distillation for reuse.

In order to suppress the shrinkage of a porous membrane, a heat treatment such as heat setting and heat relaxation may be performed after the stretching process or after formation of the porous membrane. Alternatively, the porous membrane may be subjected to a post-treatment such as a hydrophilic treatment using a surfactant or the like, and a cross-linking treatment using ionizing radiation or the like.

[Separator for Nonaqueous Electrolyte Batteries]

A separator for nonaqueous electrolyte batteries including the multilayer porous membrane of the present embodiment is described as follows.

The multilayer porous membrane of the present embodiment is suitable for use in a separator for batteries which separates a positive electrode and a negative electrode in a battery, due to having excellent heat resistance and shut-down function. In particular, the multilayer porous membrane of the present embodiment is hardly short-circuited even at high temperature, capable of being safely used as a separator for high electromotive force batteries, particularly suitable, for example, for use as a separator for lithium ion secondary batteries to be mounted in a vehicle.

Examples of the high electromotive force batteries include a nonaqueous electrolyte battery. A nonaqueous electrolyte battery may be manufactured by a conventional method. For example, the battery may be manufactured by disposing the separator for nonaqueous electrolyte batteries of the present embodiment between a positive electrode and a negative electrode, with a nonaqueous electrolyte being retained.

The air permeability of the separator for batteries of the present embodiment is not particularly limited, and, for example, preferably 10 s/100 cc or more and 500 s/100 cc or less, more preferably 20 s/100 cc or more and 400 s/100 cc or less, still more preferably 30 s/100 cc or more. With an air permeability of 10 s/100 cc or more, self discharge tends to be reduced, and with an air permeability of 650 s/100 cc or less, good charge/discharge characteristics tend to be obtained.

The membrane thickness of the separator for batteries of the present embodiment is not particularly limited, and, for example, preferably 2 µm or more and 200 µm or less, more preferably 5 µm or more and 100 µm or less, still more preferably 7 µm or more and 30 µm or less. With a membrane thickness of 2 µm or more, the mechanical strength tends to be sufficient. With a membrane thickness of 200 µm or less, the capacity enlargement of a battery tends to be more easily achieved due to reduction in the occupied volume of the separator.

The thermal shrinkage ratio at 120° C. of the separator for batteries of the present embodiment is not particularly limited, and, for example, preferably 0% or more and 5% or less in both of MD direction and TD direction, more preferably 0% or more and 2% or less. With a thermal shrinkage ratio at 120° C. of 5% or less in both of MD direction and TD direction, short circuiting hardly occurs with inhibition of the rupture of the membrane of the separator in abnormal heat generation of a battery, which is preferred.

[Nonaqueous Electrolyte Battery]

The nonaqueous electrolyte battery of the present embodiment comprises a separator which contains a polyolefin microporous membrane, a positive electrode, a negative electrode, an electrolyte, and an porous layer comprising the inorganic filler disposed on at least one side of the polyolefin microporous membrane or on the surface of the positive electrode or the negative electrode. The porous layer has the same structure as described above. Such a nonaqueous electrolyte battery has higher output characteristics.

Known positive electrodes, negative electrodes, and non-aqueous electrolytes may be used without particular limitations. Examples of the positive electrode material which can be contained in a positive electrode include a lithium-containing composite oxide such as $LiCO_2$, $LiNiO_2$, spinel-type $LiMnO_4$, $Li[Ni_xMn_yCo_z]O_2$ (x, y, and z satisfy: $x+y+z=1$, $0 \leq x<1$, $0 \leq y<1$, and $0 \leq z<1$), and olivine-type $LiFePO_4$, though not particularly limited.

Examples of the negative electrode material which can be contained in a negative electrode include: a carbon material such as graphite, hardly graphitizable carbon, easily graphitizable carbon, and a composite oxide; silicon, tin, metal lithium, and various alloy material.

As the nonaqueous electrolyte, an electrolyte including an electrolyte dissolved in an organic solvent may be used. Examples of the organic solvent include propylene carbonate, ethylene carbonate, dimethyl carbonate, diethyl carbonate, and ethylmethyl carbonate, though not particularly limited. Examples of the electrolyte include a lithium salt such as $LiClO4$, $LiBF4$, and $LiPF6$, though not particularly limited.

The various parameters described above are measured in accordance with the measurement method in the below-mentioned Examples, unless otherwise specified.

EXAMPLES

Although the present embodiment is more specifically described with reference to Examples and Comparative Examples, the present embodiment is not limited to the following Examples without departing from the gist. The physical properties in Examples were measured by the following method.

(1) Viscosity Average Molecular Weight (Mv) of Polyethylene and Polypropylene

In order to prevent the deterioration of samples, 2,6-di-t-butyl-4-methylphenol was dissolved in decahydronaphthalene at a concentration of 0.1 mass % (hereinafter abbreviated as "DHN") for use as the solvent for the samples. The sample was dissolved in DHN at a concentration of 0.1 mass % at 150° C. to obtain a sample solution. The sample solution in an amount of 10 mL was sampled and the number of seconds (t) required for passing between the marked lines at 135° C. was measured by a Cannon-Fenske viscometer (SO100). In addition, 10 mL of DHN heated to 150° C. was sampled and the number of seconds ($t_B$) required for passing between the marked lines of the viscometer was measured by the same method. Using the obtained numbers of seconds for passing, i.e. t and $t_B$, the limiting viscosity [η] was calculated from the following conversion formula:

$$[\eta]=(1.651t/t_B-0.651)^{0.5}-1)/0.0834$$

The viscosity average molecular weight (Mv) was calculated from the obtained [η]. Mv of the raw material polyethylene, the raw material polyolefin composition, or the microporous membrane was obtained from the following formula:

$$[\eta]=6.77\times10^{-4}Mv^{0.67}$$

Mv of the raw material polypropylene was obtained from the following formula:

$$[\eta]=1.10\times10^{-4}Mv^{0.80}$$

(2) Membrane Thickness of Multilayer Porous Membrane and Polyolefin Microporous Membrane (Layer A), and Layer Thickness of Porous Layer (Layer B)

Samples with an MD of 10 cm by a TD of 10 cm were cut out from the multilayer porous membrane and layer A, and the membrane thickness was measured at 9 points selected in a grid pattern (3 points by 3 points) using a dial gauge (PEACOCK No. 25 (registered trade mark), Ozaki Mfg. Co., Ltd.). The averages of the measured values at 9 points were assumed to be the membrane thickness (µm) of the multilayer membrane and the layer A. The difference in the membrane thickness between the multilayer membrane and the layer A thus measured was assumed to be the layer thickness (µm) of the layer B.

(3) Porosity of Polyolefin Microporous Membrane (Layer A)

A 10 cm by 10 cm square sample was cut out from the microporous membrane, and the volume ($cm^3$) and mass (g) of the sample were obtained. From the volume, the mass, and membrane density ($g/cm^3$), the porosity was calculated using the following formula:

Porosity=(volume−mass/membrane density)/volume×100

The membrane density was calculated from the fraction of the composition, assuming 0.95 for polyethylene and 0.91 for polypropylene.

(4) Air Permeability of Multilayer Porous Membrane

Using a Gurley air permeability tester in accordance with JIS P-8117 (G-B2 (trade mark) manufactured by Toyo Seiki Seisaku-sho, Ltd., inner cylinder mass: 567 g), the time (seconds) required for 100 cc of air to pass through a multilayer porous membrane having an area of 645 $mm^2$ (circle with a diameter of 28.6 mm) was measured at 23° C. The measured time was assumed to be the air permeability (s/100 cc) of the multilayer porous membrane.

(5) Average Particle Size of Inorganic Filler

An inorganic filler was added to distilled water, to which a small amount of sodium hexametaphosphate aqueous solution was then added. The inorganic filler was then dispersed by an ultrasonic homogenizer for 1 minute. The particle size distribution was measured by a laser particle size distribution analyzer (MICROTRAC MT3300EX manufactured by Nikkiso Co., Ltd.), and the particle size at a 50% cumulative frequency was assumed to be the average particle size (μm).

(6) Aspect Ratio of Inorganic Filler in Porous Layer (Layer B)

The cross section of the multilayer membrane was photographed by a scanning electron microscope (SEM) "HITACHI S-4700" (manufactured by Hitachi High-Tech Fielding Corporation) at a photographing magnification of 10,000, and the inorganic filler in the layer B was subjected to image processing to obtain the aspect ratio. When the fillers were bound to each other, individual fillers having a length and a width clearly identified were selected for calculation of the aspect ratio based thereon. More specifically, 10 pieces of fillers having a length and a width clearly identified were selected, and the length of major axis was divided by the length of minor axis for individual fillers. The average of the quotients was assumed to be the aspect ratio. When the number of fillers having a length and a width clearly identified was less than 10 in a visual field, the 10 pieces were selected from a plurality of visual fields.

(7) Thermal Shrinkage Ratio of Multilayer Porous Membrane at 120° C.

A sample was cut out from the multilayer porous membrane, having a size of 100 mm in MD direction by 100 mm in TD direction, and was left standing in an oven at 120° C. for 1 hour. On this occasion, the sample was held between two sheets of paper to prevent the hot air from blowing directly on the sample. The sample taken out from the oven was cooled down to room temperature. The length (mm) of the sample was then measured, and the MD and TD thermal shrinkage ratios were calculated.

MD thermal shrinkage ratio (%)=(100−MD length after heating)/100×100

TD thermal shrinkage ratio (%)=(100−TD length after heating)/100×100

(8) Membrane Resistance of Multilayer Porous Membrane

Six sheets of samples having a diameter of 2.0 mm were cut out from the multilayer porous membrane and impregnated with 1 M of LiBF4 propylene carbonate/ethylene carbonate (1/1 mass ratio) as an electrolyte. One of the impregnated porous membranes was set in an NC cell, and the NC cell was assembled. A lid was tightened with a torque wrench (tightening torque: 0.8 Nm). The assembled NC cell was placed in a thermostatic chamber with an atmosphere at 25° C., and the membrane resistance was measured under conditions with a frequency of 100 kHz and an open circuit voltage of 0.01 V using an LCR meter (the measured membrane resistance: R1). Subsequently, the measured NC cell was disassembled, and the remaining five impregnated porous membranes were piled up for setting in the NC cell. The NC cell was reassembled and the resistance of the six sheets in a lump was measured under the same conditions (the measured membrane resistance: R6). From the measured membrane resistances R1 and R6, the membrane resistance R ($\Omega \cdot cm^2$) per sheet of the multilayer porous membrane was calculated based on the following formula:

R=(R6−R1)/5

(9) Pore Structure (Proportion of the Pores Having an Angle θ in the Range of 60°≤θ≤120°

In order to specify the angle θ of the pore structure of the porous layer (layer B), first, the separator was subjected to broad ion beam (BIB) cross sectioning. In the processing, the separator was cooled until immediately before processing for preventing thermal damage in an as needed basis. More particularly, the separator was left standing in a cooling device at −40° C. for 1 day. A smooth cross section of the separator was thus obtained.

The cross section of the separator thus obtained was subjected to a conductive treatment with a paste of C and a coating of Os, so as to be photographed by "HITACHI S-4700" (manufactured by Hitachi High-Tech Fielding Corporation) at a photographing magnification of 10,000 and an accelerating voltage of 1.0 kV, with a detector of secondary electrons (upper). From the electronic image of the cross-sectional SEM image thus obtained, the angle θ of a pore was calculated.

The angle θ was calculated by the following method using an image processing software "Image J" (version 1.46). The electronic image of a target cross-sectional SEM view was displayed and a known distance in the image was measured by a line selection tool "Straight." "Analyze" to "SET SCALE" was opened and a measurement unit and the known distance were inputted for setting a scale. Subsequently, a pretreatment for binarization was performed by painting the pores in the layer B in a black color as voids, using "Paintbrush Tool."

When the pores were not clearly identified, a dark part with no filler located in the rear was first identified, and a region with a closed contour around the dark part was then identified as a pore (void), as illustrated in FIG. 5. In contrast, it could not be evaluated that a filler part positioned slightly backward of the BIB-processed cross section contributed to the ionic conductivity. Consequently, the filler part was not identified as a pore. Although the contour identified around the dark part ending off halfway at the right end and the left end of an SEM image, the portion was identified as a pore as illustrated in FIG. 5. The details of the identification of pores are as described with reference to FIG. 5.

As described above, after the pores (voids) were painted, a binarization was performed. More particularly, using "Rectangular selections" for selecting an evaluation area, a desired region (layer B) was selected. In the selection, the surface layer part of the layer B was excluded. Subsequently, in order to make the selected area in a separate file, a new electronic image including the layer B alone was made, using "Image" to "Duplicate." Subsequently, the electronic image thus obtained was subjected to a treatment for identifying pores. More particularly "Image" to "Adjust" to "Threshold" was selected and the regions having a gradation of "0 to 100" in 256 gradations were painted in a single color. Subsequently, "Analyze particles" was selected, and "0.01 μm² or more" was inputted into an item "Size." Further, "Ellipse" was selected in an item Show, so that an image including each of the pores transformed into an ellipse was obtained. Lastly, an angle θ formed between the major axis of the pore transformed into an ellipse and the axis in parallel with the interface between the microporous membrane and the porous layer was mechanically obtained. A histogram of the angle θ data of the pores having an area of 0.01 μm² or more was made, so that the proportion of the pores in the range of 60°≤θ≤120° was calculated.

Figure 2:
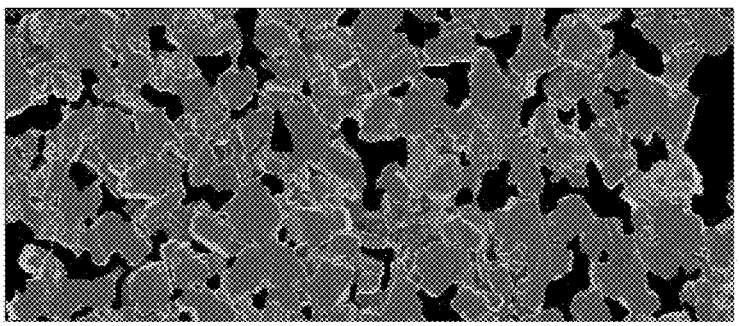
FIG. 2 shows a processed image of the cross-sectional SEM image of the porous layer of the multilayer porous membrane in Example 1, with pores painted in black color.
Figure 3:
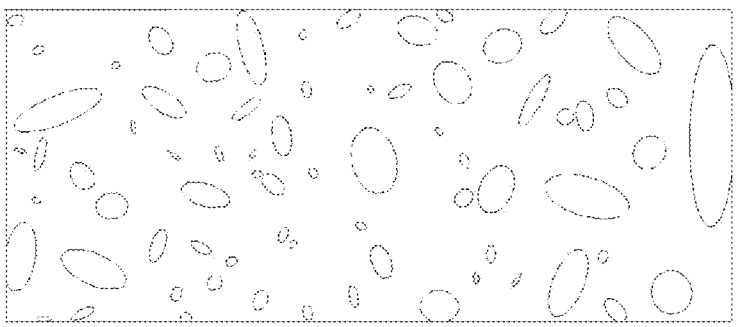
FIG. 3 shows a processed image of the cross-sectional SEM image of the porous layer of the multilayer porous membrane in Example 1, with pores of 0.01 µm² or more being transformed into ellipses after image processing.
Figure 4:
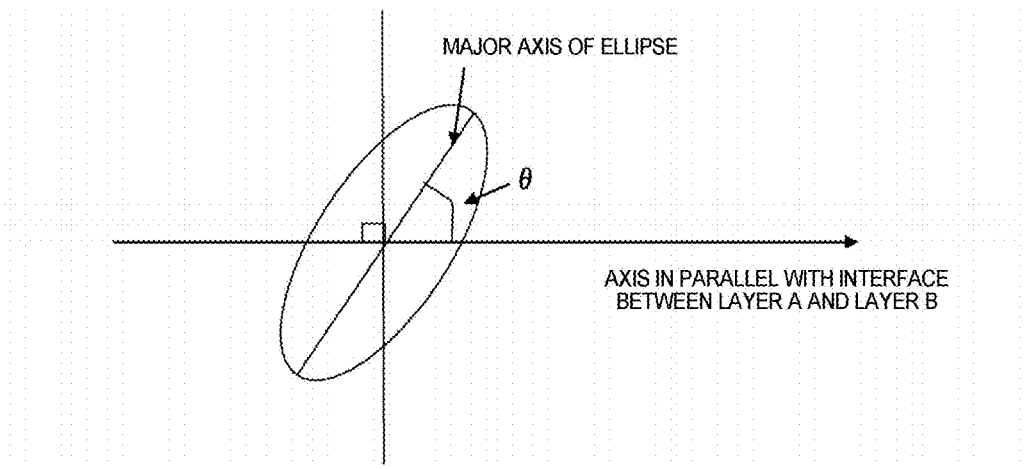
FIG. 4 shows a schematic view illustrating the angle θ formed between the major axis of an ellipse and a straight line in parallel with a membrane plane, for the processed image of a pore in a porous layer transformed into the ellipse.

As an example, the cross-sectional SEM image of a separator obtained in Example 1 is shown in FIG. 2. A diagram of pores of 0.01 μm² or more transformed into ellipses after binarization of the cross-sectional SEM image of the porous layer of the multilayer porous membrane in Example 1 is shown in FIG. 3.

(10) Rate Characteristics of Multilayer Porous Membrane a. Manufacturing of Positive Electrode A slurry was prepared by dispersing 91.2 parts by mass of lithium-nickel-manganese-cobalt composite oxide (Li[Ni$_{1/3}$Mn$_{1/3}$Co$_{1/3}$]O$_2$) as a positive electrode active material, 2.3 parts by mass of each of flake graphite and acetylene black as conductive materials, and 4.2 parts by mass of polyvinylidene fluoride (PVdF) as a resin binder in N-methylpyrrolidone (NMP). The slurry was applied to one side of an aluminum foil with a thickness of 20 μm to make a positive electrode using a die coater, with an amount of the positive electrode active material applied of 120 g/m$^2$. The coating was dried at 130° C. for 3 minutes, and compressed to a bulk density of the positive electrode active material of 2.90 g/cm$^3$ to make a positive electrode, using a roll pressing machine. A circle having an area of 2.00 cm$^2$ was stamped out from the compressed product.

b. Manufacturing of Negative Electrode

A slurry was prepared by dispersing 96.6 parts by mass of artificial graphite as a negative electrode active material, and 1.4 parts by mass of an ammonium salt of carboxymethyl cellulose and 1.7 parts by mass of styrene-butadiene copolymer latex as resin binders in refined water. The slurry was applied to one side of a copper foil with a thickness of 16 μm to make a negative electrode collector using a die coater, with an amount of the negative electrode active material of 53 g/m$^2$. The coating was dried at 120° C. for 3 minutes, and compressed to a bulk density of the negative electrode active material of 1.35 g/cm$^3$ to make a negative electrode, using a roll pressing machine. A circle having an area of 2.05 cm$^2$ was stamped out from the compressed product.

c. Nonaqueous Electrolyte

The nonaqueous electrolyte was prepared by dissolving LiPF$_6$ as a solute in a mixed solvent of ethylene carbonate: ethyl carbonate=1:2 (volume ratio) at a concentration of 1.0 ml/L.

d. Assembly of Battery

A negative electrode, a multilayer porous membrane, and a positive electrode were stacked from the bottom in this order, such that the surfaces of the positive electrode active material and the negative electrode active material were opposed to each other. The laminate was accommodated in a stainless steel metal container with a lid insulated from the container body, such that the copper foil of negative electrode and the aluminum foil of positive electrode are contacted with the container body and the lid, respectively, so as to obtain a cell. The cell was dried at 70° C. for 10 hours under reduced pressure. Subsequently, a nonaqueous electrolyte was injected into the container in an argon box, and the container was sealed to make a battery for evaluation.

e. Evaluation of Rate Characteristics

The battery assembled in d. was charged to a battery voltage of 4.2 V at a current of 3 mA (about 0.5 C) at 25° C., and while the voltage was kept at 4.2 V, the current was gradually reduced from 3 mA. The first charging after manufacturing of the battery was thus performed for about 6 hours in total. Subsequently, the battery was discharged to a battery voltage of 3.0 V at a current of 3 mA.

Subsequently, the battery was charged to a battery voltage of 4.2 V at a current of 6 mA (about 1.0 C) at 25° C., and while the voltage was kept at 4.2 V, the current was gradually reduced from 6 mA. The charging was thus performed for about 3 hours in total. Subsequently, the battery was discharged to a battery voltage of 3.0 V at a current of 60 mA, and the discharge capacity on that occasion was assumed to be the discharge capacity at 10 C (mAh).

Subsequently, the battery was charged to a battery voltage of 4.2 V at a current of 6 mA (about 1.0 C) at 25° C., and while the voltage was kept at 4.2 V, the current was gradually reduced from 6 mA. The charging was thus performed for about 3 hours in total. Subsequently, the battery was discharged to a battery voltage of 3.0 V at a current of 60 mA (about 10 C), and the discharge capacity on that occasion was assumed to be the discharge capacity at 10 C (mAh).

The ratio of the discharge capacity at 10 C to the discharge capacity at 1 C was calculated as rate characteristics.

Rate characteristics at 10 C (%)=(discharge capacity at 10 C/discharge capacity at 1 C)×100

Example 1

Using a tumbler blender, 47 wt % of a homopolymer of polyethylene having an Mv of 700,000, 46 wt % of a homopolymer of polyethylene having an Mv of 300,000, and 7 wt % of a polypropylene having an Mv of 400,000 were dry blended. To 99 wt % of the mixture composed only of the polymers thus obtained, 1 wt % of pentaerythrityl-tetrakis-[3-(3, 5-di-t-butyl-4-hydroxyphenyl)propionate] as an antioxidant was added to be dry blended once more using a tumbler blender, so that a mixture of the polymers and the like was obtained. The obtained mixture of polymers and the like was subjected to nitrogen substitution and then supplied to a biaxial extruder under nitrogen atmosphere through a feeder. Further, a liquid paraffin (dynamic viscosity at 37.78° C.: 7.59×10$^{-5}$ m$^2$/s) was injected into an extruder cylinder using a plunger pump.

The feeder and the pump were adjusted such that the liquid paraffin occupied a proportion of 65 wt % in the whole mixture to be melt kneaded and extruded. The melt kneading was performed under conditions with a set temperature of 200° C., a screw rotation speed of 240 rpm, and a discharge rate of 12 kg/h.

Subsequently, the melt kneaded product was extruded and cast on a cooling roll having a surface temperature controlled at 25° C. through a T-die, so that a gel sheet having a thickness of 2,000 μm was obtained.

Subsequently, the gel sheet was introduced into a concurrent biaxial tenter stretching machine and subjected to biaxial stretching. The set stretching conditions include an MD ratio of 7.0, a TD ratio of 7.0, and a set temperature of 125° C.

Subsequently, the stretched sheet was introduced into a methyl ethyl ketone tank, and sufficiently immersed in methyl ethyl ketone for extraction removal of the liquid paraffin. The methyl ethyl ketone was then removed by drying.

Subsequently, the sheet was introduced into a TD tenter and subjected to heat setting. During the heat setting, the stretching temperature was 128° C., and the ratio was 2.0. During the subsequent relaxation, the temperature was 133° C., and the relaxation ratio was 0.80.

Consequently, a porous membrane of polyolefin resin having a membrane thickness of 16 μm, a porosity of 40%, and an air permeability of 180 s/100 cc was obtained.

Subsequently, each of 47.7 parts by weight of aluminum hydroxide oxide in a block shape and 0.48 parts by weight of an ammonium salt of polycarboxylic acid as inorganic fillers was uniformly dispersed in 47.7 parts by weight of water, and the dispersion was subjected to bead milling, such that aluminum hydroxide particles were crushed into an average particle size of 1.0 μm. Subsequently, an aqueous solution with addition of 0.10 parts by weight of a thickener and 4.1 parts by weight of acrylic latex was applied to the surface of the porous membrane of polyolefin resin, using a gravure coater at a line speed of 30 m/min. The coated membrane was dried at 40° C. for 10 seconds, and then at a drying temperature of 70° C. for a drying time of 10 seconds or more for removal of water, so that a multilayer porous membrane having a total membrane thickness of 20 μm was obtained, including a porous layer (layer B) having a thickness of 4 μm formed on a porous membrane (layer A).

Example 2

Except that the porous layer (layer B) had a thickness of 7 μm, a multilayer porous membrane was obtained by the same method as in Example 1.

Example 3

Except that plate-like aluminum hydroxide oxide particles were used, a multilayer porous membrane was obtained by the same method as in Example 1.

Example 4

Except that the porous layer (layer B) had a thickness of 9 μm, a multilayer porous membrane was obtained by the same method as in Example 1.

Example 5

Except that the porous layer (layer B) had a thickness of 1.5 μm, a multilayer porous membrane was obtained by the same method as in Example 1.

Example 6

Except that the porous layer (layer B) had a thickness of 12 μm, a multilayer porous membrane was obtained by the same method as in Example 1.

Example 7

Except that the line speed for forming the porous layer (layer B) was set at 3 m/min, a multilayer porous membrane was obtained by the same method as in Example 1.

Comparative Example 1

Except that the line speed for forming the porous layer (layer B) was set at 3 m/min, with a drying temperature at 80° C. and a drying time of 10 seconds or more, and the porous layer (layer B) had a thickness of 6 μm, a multilayer porous membrane was obtained by the same method as in Example 1.

Comparative Example 2

Except that plate-like aluminum hydroxide oxide particles were used and drying temperature after coating application was set at 70° C. for 10 seconds or more, a multilayer porous membrane was obtained by the same method as in Example 1.

Comparative Example 3

Except that the drying temperature was set at 70° C., and the drying time was set at 10 seconds or more for forming the porous layer (layer B), a multilayer porous membrane was obtained by the same method as in Example 1.

Comparative Example 4

Except that the porous layer (layer B) had a thickness of 2.5 μm, a multilayer porous membrane was obtained by the same method as in Comparative Example 3.

Comparative Example 5

Except that the drying temperature was set at 40° C., and the drying time was set at 10 seconds or more for forming the porous layer (layer B), a multilayer porous membrane was obtained by the same method as in Example 1.

In the following Table 1, the physical properties and evaluation results of the porous membranes, the porous layers, and the multilayer porous membranes obtained in the Examples and the Comparative Examples are shown.

TABLE 1

| | | | Example 1 | Example 2 | Example 3 | Example 4 | Example 5 | Example 6 | Example 7 |
|---|---|---|---|---|---|---|---|---|---|
| Coating conditions | Line speed | m/min | 30 | 30 | 30 | 30 | 30 | 30 | 3 |
| | Drying time at 40° C. | sec | 10 | 10 | 10 | 10 | 10 | 10 | 10 |
| | Drying time at 70° C. | sec | 10≤ | 10≤ | 10≤ | 10≤ | 10≤ | 10≤ | 10≤ |
| | Drying temperature | ° C. | 40 → 70 | 40 → 70 | 40 → 70 | 40 → 70 | 40 → 70 | 40 → 70 | 40 → 70 |
| Porous membrane (layer A) | Membrane thickness | μm | 16.0 | 16.0 | 16.0 | 16.0 | 16.0 | 16.0 | 16.0 |
| Porous layer (layer B) | Inorganic filler | — | AlO(OH) | AlO(OH) | AlO(OH) | AlO(OH) | AlO(OH) | AlO(OH) | AlO(OH) |
| | Particle shape | | Block shape | Block shape | Plate shape | Block shape | Block shape | Block shape | Block shape |
| | Proportion of pores with angle θ: 60° ≤ θ ≤ 120° | % | 42 | 41 | 32 | 40 | 43 | 38 | 35 |
| | Aspect ratio of inorganic filler | — | 2.2 | 2.2 | 3.9 | 2.2 | 2.2 | 2.2 | 2.2 |
| | Average particle size of inorganic filler $D_{50}$ | μm | 1.0 | 1.0 | 1.0 | 1.0 | 1.0 | 1.0 | 1.0 |
| | Layer density | g/m²/(μm) | 1.4 | 1.5 | 1.6 | 1.6 | 1.3 | 1.6 | 1.5 |
| | Layer thickness | μm | 4.0 | 7.0 | 4.0 | 9.0 | 1.5 | 12.0 | 4.0 |

TABLE 1-continued

| | | | | | | | | | |
|---|---|---|---|---|---|---|---|---|---|
| Multilayer porous layer | Total thickness of membrane | μm | 20.0 | 23.0 | 20.0 | 25.0 | 17.5 | 28.0 | 20.0 |
| | Thermal shrinkage ratio (MD) at 120° C. | % | 1 | 1 | 1 | 1 | 1 | 1 | 1 |
| | Thermal shrinkage ratio (TD) at 120° C. | % | 1 | 1 | 1 | 1 | 1 | 1 | 1 |
| | Air permeability | sec/100 cc | 200 | 210 | 220 | 215 | 190 | 220 | 210 |
| | Membrane resistance (25° C.) | $\Omega \cdot cm^2$ | 2.4 | 2.2 | 2.5 | 2.4 | 2.2 | 2.6 | 2.6 |
| Nonaqueous electrolyte battery | Rate characteristics | % | 60 | 59 | 58 | 58 | 65 | 56 | 59 |

| | | | Comparative Example 1 | Comparative Example 2 | Comparative Example 3 | Comparative Example 4 | Comparative Example 5 |
|---|---|---|---|---|---|---|---|
| Coating conditions | Line speed | m/min | 3 | 30 | 30 | 30 | 30 |
| | Drying time at 40° C. | sec | — | — | — | — | 10≤ |
| | Drying time at 70° C. | sec | 10≤ | 10≤ | 10≤ | 10≤ | — |
| | Drying temperature | ° C. | 80 | 70 | 70 | 70 | 40 |
| Porous membrane (layer A) | Membrane thickness | μm | 16.0 | 16.0 | 16.0 | 16.0 | 16.0 |
| Porous layer (layer B) | Inorganic filler | — | AlO(OH) | AlO(OH) | AlO(OH) | AlO(OH) | AlO(OH) |
| | Particle shape | | Block shape | Plate shape | Block shape | Block shape | Block shape |
| | Proportion of pores with angle θ: 60° ≤ θ ≤ 120° | % | 22 | 18 | 27 | 28 | 26 |
| | Aspect ratio of inorganic filler | — | 2.5 | 3.9 | 2.2 | 2.2 | 2.2 |
| | Average particle size of inorganic filler $D_{50}$ | μm | 1.0 | 1.0 | 1.0 | 1.0 | 1.0 |
| | Layer density | g/m²/(μm) | 1.7 | 1.7 | 1.4 | 1.4 | 1.6 |
| | Layer thickness | μm | 6.0 | 4.0 | 4.0 | 2.5 | 4.0 |
| Multilayer porous layer | Total thickness of membrane | μm | 22.0 | 20.0 | 20.0 | 18.5 | 20.0 |
| | Thermal shrinkage ratio (MD) at 120° C. | % | 1 | 1 | 1 | 1 | 1 |
| | Thermal shrinkage ratio (TD) at 120° C. | % | 1 | 1 | 1 | 1 | 1 |
| | Air permeability | sec/100 cc | 230 | 230 | 205 | 195 | 215 |
| | Membrane resistance (25° C.) | $\Omega \cdot cm^2$ | 3.7 | 3.8 | 3.6 | 3.2 | 3.8 |
| Nonaqueous electrolyte battery | Rate characteristics | % | 48 | 49 | 60 | 63 | 58 |

In Examples 1 to 7, the membrane resistance at 25° C. is 3.1 Ω/cm² or less, which is extremely low. It is conceivable that due to the shape of the inorganic filler for use and the slow drying rate after coating application with temperature control, the pore structures in the range of 60°≤θ≤120° occupied a proportion of 30% or more in the formed porous layer, so that a fast diffusion rate of lithium ions was achieved.

In contrast, it is conceivable that in Comparative Examples 1 to 5, due to the rapid drying rate after coating application, the pore structures in the range of 60°≤θ≤120° occupied a proportion of about 20%, so that the membrane resistance increased with the extended diffusion length of lithium ions.

Further, results with significant difference were obtained with regard to the rate characteristics in discharge at 10 C.

The present application is based on Japanese Patent Application No. 2013-134439 filed with the Japanese Patent Office on Jun. 27, 2013, and the contents of which are incorporated herein by reference.

INDUSTRIAL APPLICABILITY

The separator for nonaqueous electrolyte batteries of the present invention allows a nonaqueous electrolyte battery with high safety and high output characteristics to be obtained, having an industrial applicability as a separator for a lithium ion secondary batteries for high output usage, high-capacity in-vehicle lithium ion secondary batteries which require many cells, and lithium ion capacitors.

The invention claimed is:

1. A separator for nonaqueous electrolyte batteries comprising a multilayer porous membrane, comprising:
   a polyolefin microporous membrane; and
   a porous layer comprising an inorganic filler, disposed on at least one side of the polyolefin microporous membrane;
   wherein, in pores with an area of 0.01 μm² or more in a cross section of the porous layer, the pores having an angle θ formed between a major axis of each pore transformed into an ellipse in a cross-sectional SEM image and an axis in parallel with an interface between the microporous membrane and the porous layer in a range of 60°≤θ≤120° occupying a proportion of 30% or more therein,
   a preparing process of the cross section of the porous layer comprising:
   (x1) an ion beam cross sectioning step of the separator;
   (x2) a conductive treatment step of the cross section of the separator;

(x3) a photographing step of the cross section after treatment at a photographing magnification of 10,000 to obtain the cross-sectional SEM image;

(X4) a pretreatment step of painting the pore in the cross-sectional SEM image in black;

(X5) a binarization step of the cross-sectional SEM image after pretreatment; and (X6) a transforming step of transforming the pore of 0.01 µm² or more in the cross-sectional SEM image after binarization into the ellipse.

2. The separator for the nonaqueous electrolyte batteries according to claim 1, wherein the porous layer has a thickness of 2 µm or more and 10 µm or less.

3. The separator for the nonaqueous electrolyte batteries according to claim 1, wherein the inorganic filler has an aspect ratio of 1 or more and 3 or less.

4. The separator for the nonaqueous electrolyte batteries according to claim 1,
wherein, in the pores with the area of 0.01 µm² or more in the cross section of the porous layer, the pores having the angle θ formed between the major axis of each pore and the axis in parallel with the interface between the microporous membrane and the porous layer in the range of $60°≤θ≤120°$ occupying the proportion of 40% or more therein.

5. The separator for the nonaqueous electrolyte batteries according to claim 1, wherein, in the pores with the area of 0.01 µm² or more in the cross section of the porous layer, the pores having the angle θ formed between the major axis of each pore and the axis in parallel with the interface between the microporous membrane and the porous layer in the range of $60°≤θ≤120°$ occupying the proportion of more than 40% and less than 50% therein.

6. The separator for the nonaqueous electrolyte batteries according to claim 1,
wherein, in the pores with the area of 0.01 µm² or more in the cross section of the porous layer, the pores having the angle θ formed between the major axis of each pore and the axis in parallel with the interface between the microporous membrane and the porous layer in the range of $60°≤θ≤120°$ occupying the proportion of 30% or more and less than 50% therein.

7. The separator for the nonaqueous electrolyte batteries according to claim 1,
wherein, in the pores with the area of 0.01 µm² or more in the cross section of the porous layer, the pores having the angle θ formed between the major axis of each pore and the axis in parallel with the interface between the microporous membrane and the porous layer in the range of $60°≤θ≤120°$ occupying the proportion of 30% or more and 45% or less therein.

8. The separator for the nonaqueous electrolyte batteries according to claim 1,
wherein, in the pores with the area of 0.01 µm² or more in the cross section of the porous layer, the pores having the angle θ formed between the major axis of each pore and the axis in parallel with the interface between the microporous membrane and the porous layer in the range of $60°≤θ≤120°$ occupying the proportion of 30% or more and 43% or less therein.

9. The separator for the nonaqueous electrolyte batteries according to claim 1,
wherein, in the pores with the area of 0.01 µm² or more in the cross section of the porous layer, the pores having the angle θ formed between the major axis of each pore and the axis in parallel with the interface between the microporous membrane and the porous layer in the range of $60°≤θ≤120°$ occupying the proportion of 30% or more and less than 40% therein.

10. The separator for the nonaqueous electrolyte batteries according to claim 1, wherein a shape of the inorganic filler is a plate shape, a columnar shape, a block shape, or a polyhedron shape.

11. The separator for the nonaqueous electrolyte batteries according to claim 1, wherein an average particle size of the inorganic filler is 0.1 µm or more and 4.0 µm or less.

12. The separator for the nonaqueous electrolyte batteries according to claim 1, wherein the inorganic filler comprises one or more selected from the group consisting of alumina, silica, titania, zirconia, magnesia, ceria, yttria, zinc oxide, iron oxide, silicon nitride, titanium nitride, boron nitride, silicon carbide, calcium carbonate, magnesium sulfate, aluminum sulfate, aluminum hydroxide, potassium titanate, talc, kaolinite, dickite, nacrite, halloysite, pyrophyllite, montmorillonite, sericite, mica, zeolite, calcium silicate, and silica sand.

13. The separator for the nonaqueous electrolyte batteries according to claim 1, wherein the inorganic filler comprises aluminum hydroxide oxide.

14. The separator for the nonaqueous electrolyte batteries according to claim 13, wherein the porous layer has a thickness of 2 µm or more and 10 µm or less.

15. The separator for the nonaqueous electrolyte batteries according to claim 13, wherein the inorganic filler has an aspect ratio of 1 or more and 3 or less.

16. A nonaqueous electrolyte battery comprising:
a separator comprising a polyolefin microporous membrane;
a positive electrode;
a negative electrode; and
an electrolyte; and
an porous layer comprising an inorganic filler, disposed on at least one side of the polyolefin microporous membrane, or a surface of the positive electrode or the negative electrode;
wherein, in pores with an area of 0.01 µm² or more in a cross section of the porous layer, the pores having an angle θ formed between a major axis of each pore transformed into an ellipse in a cross-sectional SEM image and an axis in parallel with an interface between the polyolefin microporous membrane, the positive electrode, or the negative electrode and the porous layer in a range of $60°≤74≤120°$ occupying a proportion of 30% or more therein,
a preparing process of the cross section of the porous layer comprising:
(x1) an ion beam cross sectioning step of the separator;
(x2) a conductive treatment step of the cross section of the separator;
(x3) a photographing step of the cross section after treatment at a photographing magnification of 10,000 to obtain the cross-sectional SEM image;
(X4) a pretreatment step of painting the pore in the cross-sectional SEM image in black;
(X5) a binarization step of the cross-sectional SEM image after pretreatment; and
(X6) a transforming step of transforming the pore of 0.01 µm² or more in the cross-sectional SEM image after binarization into the ellipse.

* * * * *